(12) United States Patent
Grecco et al.

(10) Patent No.: US 7,372,871 B2
(45) Date of Patent: May 13, 2008

(54) TECHNIQUES TO REDUCE INFORMATION LOSS AND TRANSLATION COSTS IN A SYSTEM POPULATED WITH DATA SOURCES AND SINKS COMMUNICATING WITH MULTIPLE DATA REPRESENTATIONS

(75) Inventors: Joseph J. Grecco, Saddle Brook, NJ (US); Paul B. Ranford, Auckland (NZ)

(73) Assignee: Intel Corporation, Santa Clara, CA (US)

( * ) Notice: Subject to any disclaimer, the term of this patent is extended or adjusted under 35 U.S.C. 154(b) by 997 days.

(21) Appl. No.: 10/112,279

(22) Filed: Mar. 27, 2002

(65) Prior Publication Data

US 2003/0188023 A1    Oct. 2, 2003

(51) Int. Cl.
*H04J 3/18*    (2006.01)

(52) U.S. Cl. .............. 370/477; 370/468; 370/464; 370/465; 370/202; 370/521

(58) Field of Classification Search ........ 370/276, 370/277, 280, 282, 294, 464–469, 474, 477, 370/498, 529, 202, 521; 455/68–72, 414, 455/422, 426, 462, 465, 466; 709/227–231, 709/245–247

See application file for complete search history.

(56) References Cited

U.S. PATENT DOCUMENTS

| | | | | |
|---|---|---|---|---|
| 5,557,749 A | * | 9/1996 | Norris | 709/228 |
| 5,742,773 A | * | 4/1998 | Blomfield-Brown et al. | 709/228 |
| 5,764,910 A | * | 6/1998 | Shachar | 709/223 |
| 5,938,737 A | * | 8/1999 | Smallcomb et al. | 709/247 |
| 5,956,490 A | * | 9/1999 | Buchholz et al. | 709/245 |
| 6,112,250 A | * | 8/2000 | Appelman | 709/247 |
| 6,151,627 A | * | 11/2000 | McBride et al. | 709/224 |
| 6,175,856 B1 | * | 1/2001 | Riddle | 709/204 |
| 6,356,766 B1 | * | 3/2002 | Sipila | 455/465 |
| 6,385,656 B1 | * | 5/2002 | Appelman | 709/247 |
| 6,747,958 B2 | * | 6/2004 | Vayanos et al. | 370/252 |
| 6,839,413 B1 | * | 1/2005 | Brock et al. | 379/93.08 |
| 7,171,472 B2 | * | 1/2007 | O'Brien et al. | 709/226 |
| 7,257,116 B2 | * | 8/2007 | Poeluev et al. | 370/389 |
| 7,257,612 B2 | * | 8/2007 | Humenansky et al. | 709/201 |
| 7,269,609 B2 | * | 9/2007 | Starbuck | 707/201 |

FOREIGN PATENT DOCUMENTS

WO    WO 99/27691    6/1999
WO    WO 01/08434 A1    2/2001

* cited by examiner

*Primary Examiner*—Wing Chan
*Assistant Examiner*—Mark A. Mais
(74) *Attorney, Agent, or Firm*—Blakely, Sokoloff, Taylor & Zafman LLP

(57) ABSTRACT

Techniques for reducing overall information loss and processing costs due to data translation in a network populated with communicating data sources and sinks of multiple data representations is described. By employing an "optimization" technique for negotiating "least cost" data representations to be communicated between data source(s) and sink(s) where the "least cost" can be relative to, for example, fidelity requirements and processing costs of the system or the user of the system.

16 Claims, 3 Drawing Sheets

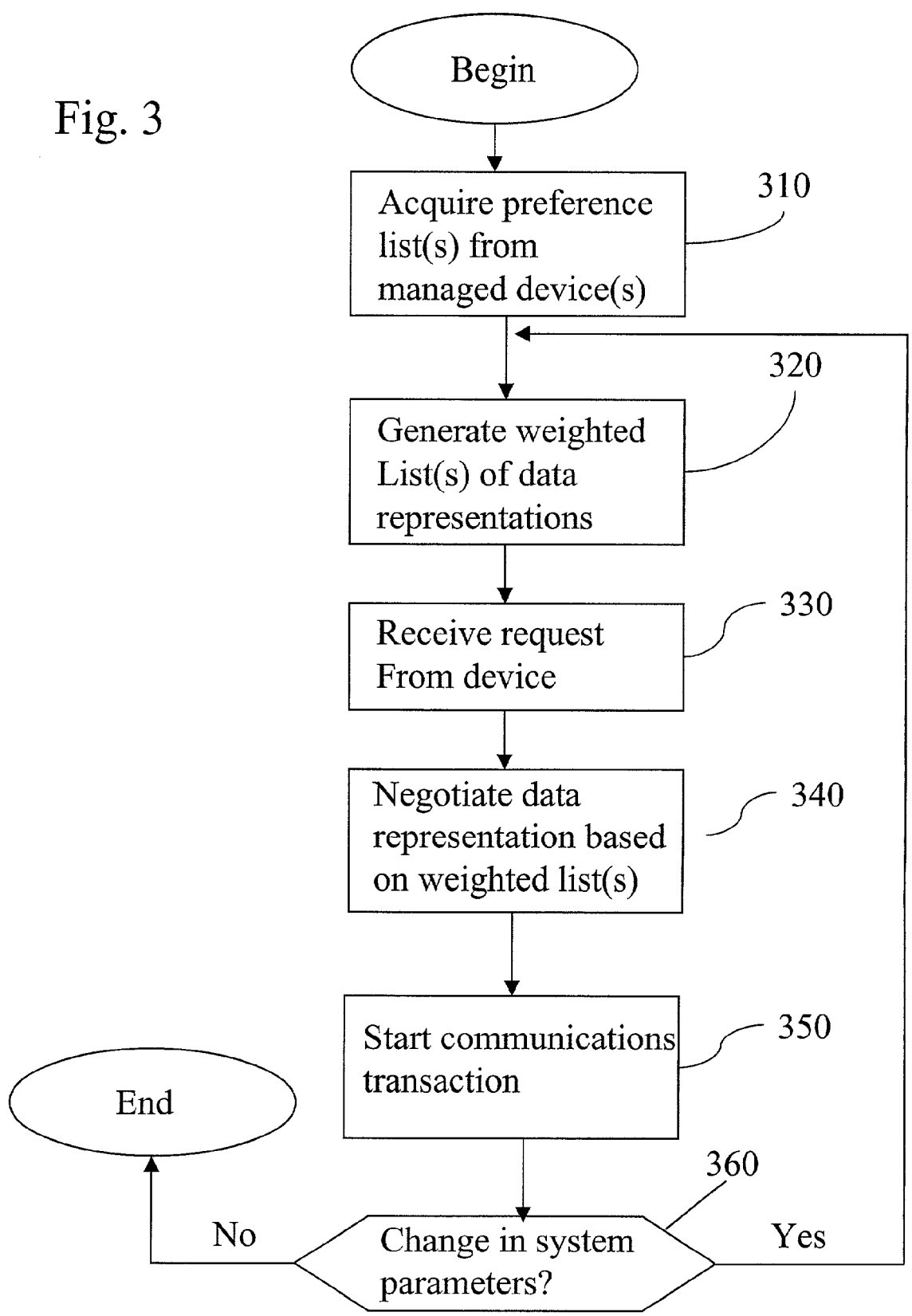

TECHNIQUES TO REDUCE INFORMATION LOSS AND TRANSLATION COSTS IN A SYSTEM POPULATED WITH DATA SOURCES AND SINKS COMMUNICATING WITH MULTIPLE DATA REPRESENTATIONS

FIELD

The invention relates to data processing. More particularly, the invention relates to techniques for transmitting data between devices capable of communicating using multiple data representations.

BACKGROUND

In networked systems various devices communicate with each other using a protocol and a data representation that is supported by both devices. Because many systems can communicate with multiple remote devices and many protocols and many data representations exist for a single type of communication, devices typically support multiple protocols and data representations. For example, computer systems can be configured to support Voice over IP (VoIP) using variable length packets as well as Voice over ATM (VoA) using standard length cells. For transmitting audio data, data representations such as, for example, G.711 and G.729 could be used. G.711 is an International Telecommunications Union (ITU) recommendation entitled "Pulse Code Modulation (PCM) of Voice Frequencies," published November, 1988. G.729 is an ITU recommendation entitled "Coding of speech at 8 kbit/s using conjugate-structure algebraic-code-excited linear-prediction (CS-ACELP)," published Mar., 1996.

Currently, the data representation to be used for a particular communication is generally negotiated in a point-to-point basis. Thus, if a computer system is used to send voice communication signals to another computer system, software components on the receiving and on the transmitting systems negotiate the data representation to be used to communicate information. Point-to-point negotiation is often sufficient for communications between a pair of devices.

For example, a protocol that allows end points to negotiate a data representation to be used is H.323, which is a standard approved by the International Telecommunications Union (ITU) to promote compatibility in videoconference communications using Internet Protocol (IP) networks. Recommendation H.323 is entitled "Visual Telephone Systems and Equipment for Local Area Networks Which Provide a Non Guaranteed Quality of Service" and was published Nov. 1996. Other protocols can also allow end points to negotiate the data representation to be used.

However, as the number of devices and/or data representation involved in communications transaction increases, the complexity of the negotiation processes increases. For example, the process becomes more complex as the following increase: the number of devices, the number of device types (the more device types, the more the possible data representations, the more chance we need transcoding, the more opportunity to lose fidelity), the number of data representations (new compression schemes), new automated media processing technologies that are sensitive to transcoding information loss or costly double-transcoding (e.g., video speech recognition), or new media transmission options that may need automatic translation or recognition (e.g., 3-D rendering of artworks).

BRIEF DESCRIPTION OF THE DRAWINGS

The invention is illustrated by way of example, and not by way of limitation, in the figures of the accompanying drawings in which like reference numerals refer to similar elements.

FIG. 3 is a flow diagram for negotiating a data representation to be used in a transaction where at least one of the participating devices in the transaction is part of a managed network.

DETAILED DESCRIPTION

Figure 1:
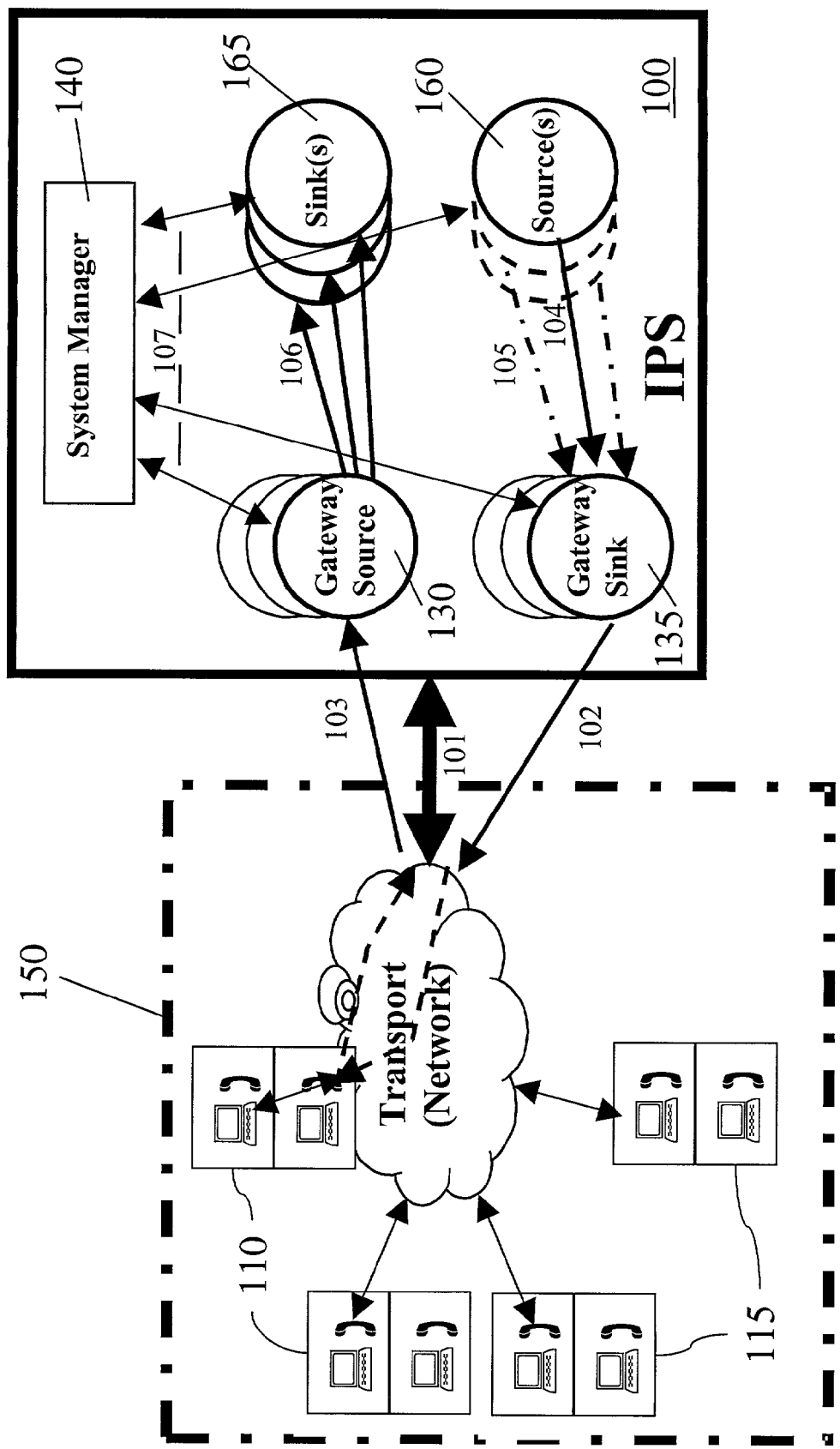
FIG. 1 is one embodiment of an electronic Information Processing System (IPS) communicating with a community of external sources and sinks.

Techniques for managing information loss and translation costs in communications between multiple devices are described. In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form in order to avoid obscuring the invention.

The techniques described herein are applicable to any data communication transaction. For example, the techniques can be applied to real time (e.g., video, voice, other biometric/sensory representation) data as well as non-real time (e.g., documents, FAX, 3D object description, email, email attachments) data. The techniques can also be applied to any transcoding-sensitive algorithms. For example, media translation (e.g., optical character reading, speech recognition), biometric verification (e.g., speech, video, retinal, hand-shape, fingerprint), biometric recognition and classification, and/or object recognition/classification/rendering).

Techniques for reducing overall information loss and processing costs due to data translation in a network populated with communicating data sources and sinks of multiple data representations are described. By employing an "optimization" technique for negotiating "least cost" data representations to be communicated between data source(s) and sink(s) where the "least cost" can be relative to, for example, fidelity requirements and processing costs of the system or the user of the system, overall performance can be improved. The terms "optimization" and "least cost" do not necessarily require optimal performance absolute least cost.

The negotiation allows consideration of factors, for example, whether voice recognition software is sensitive to transcoding error or to slight changes in audio quality. Thus, the negotiation allows for the ability to more precisely negotiate the tradeoffs between transcoding efficiency and resource cost as compared to previous techniques. This is the result of a "managing" device that can determine the requirements or preferences of devices to be included in a transaction for which the data representation is being negotiated.

The data sources and sinks are typically, but not necessarily, distributed between a "managed" network and an "unmanaged" network. In this context, a managed network is one in which the sources and/or sinks of the network are registered with a network management component. In one embodiment, data sources and/or sinks of a managed network can take configuration and/or control directives from components of the managed network. Registration can be accomplished in any manner and can be used for purposes other than and/or in addition to the negotiation process described herein.

An unmanaged network is one in which the data sources and/or sinks are not registered with a known network management component. Thus, the presence and/or characteristics of the devices on the unmanaged network are not available to other devices until an active communication session.

In one embodiment, the techniques described herein use the most commonly "understood" data representations available from the sources and sinks of the managed network as well as qualitative preferences for data representations, if any, expressed by the sinks in the managed network to generate a "weighted" list of acceptable data representations to be communicated by the data source. In an alternate embodiment, preferred and/or supported data representations can be included in the weighting of the representations included in the weighted list. In general, "understood" data representations refer to those data representations supported by a particular device. The weighted list can use any type of preference ordering or weighting scheme.

Two source and sink types referred to as a "gateway source" and a "gateway sink" use the weighted list information to negotiate data representations to be received from and transmitted to sources and sinks external to the managed network. In one embodiment, a statistical analysis is performed on the weighted list to determine the data representation to be used. The network management component can also provide a "plug-in" module that can be used by a source and/or a sink device to provide the desired transcoding functionality.

By using this technique, the number of translators required within the managed system can be reduced. The result can be that information loss and processing costs associated with the translation of data representations are reduced. Also, the number of transcoding implementations required by the network is reduced. This reduces the cost of the system in terms of processor usage and fidelity, accuracy, quality of service provided by important processing components FIG. 1 is one embodiment of an electronic Information Processing System (IPS) communicating with a community of external sources and sinks. Remote endpoints 150 is an interconnection of any number of electronic devices including external source/sink 110 and external source/sink 115. Source/sink 110 and source/sink 115 are external to IPS 100. Source/sink 110 and source/sink 115 provide and consume data from devices coupled to IPS 100. Remote endpoints 150 can communicate using any protocol known in the art.

IPS 100 is also an interconnection of any number of electronic devices including gateway source 130, gateway sink 135, network manager 140, sink(s) 165, and source(s) 160 as well as other devices not shown in FIG. 1. Any of gateway source 130, gateway sink 135, network manager 140, sink(s) 165 and source(s) 160 can be any type of electronic system, for example, a computer system, a set top box, a personal digital assistant (PDA), a telephone (wired or wireless). The devices of IPS 100 can intercommunicate using any protocol known in the art. The gateway may be a logical component that allows the managed and unmanaged components to be introduced and communicate directly if they can use a common data representation (i.e., a signaling gateway).

In one embodiment, IPS 100 and one or more of remote endpoints 150 communicate using communication path 101 to negotiate the data representations communicated between external source/sinks (e.g., 110, 115) and gateway source 130 or gateway sink 135. Protocols that can be used for communication path 101 include, for example, H.323, SIP and ISDN. Other protocols can also be used. The specific communications paths between gateway source(s) 130 and gateway sink(s) 135 are illustrated by communications paths 102 and 103.

Within IPS 100, one of source(s) 160 communicates data to gateway sink 135 using communication path 104. Additional sources can also communicate data to gateway sink 135 using, for example, communication path 105. Use of communication path 105 allows data to begin flowing between other sources and gateway sink 135 with no disruption of the "session" between the external sink and IPS 100.

Data received by gateway source 130 is transmitted to one or more of sink(s) 165 via communication path(s) 106. Communication paths 107 allow sink(s) 165 and source(s) 160 to register their respective capabilities and/or preferences with system manager 140. For example, ordered lists of data representation preferences can be communicated.

Source(s) 160 register a list of data representations (e.g., protocols, encoding) ordered by preference with network manager 140. The list can be ordered according to any relevant criteria. For example, the list can be the protocols and/or data formats supported by the source ordered by performance, or the list can be the protocols and/or data formats supported by the source ordered by preference of a user of the source. Any ordering scheme can be used.

Similarly, sink(s) 165 register a list of data representations ordered by preference with network manager 140. The ordered lists from sink(s) 165 can be ordered in any manner. Thus, network manager 140 stores the ordered lists for the sink(s) and source(s) of IPS 100. Network manager 140 can then negotiate on behalf of one or more of the sinks and/or sources to select a data representation that is most beneficial for the selected group of sink(s) and source(s) to be involved in a communication transaction.

In one embodiment, the administrator of IPS 100 can supply additional rules to be applied to the weighting process. These can be applied as adjustments to the preference list of each device, or as a heuristic to be used by the management component when generating the weighted list, or both. This information might, for example, reflect the demographics of the population of non-participating devices that the system typically communicates with.

When a source attempts to set up a communication transaction with participating sinks 150, the source queries system manager 140 to determine the list of data representations that can be used for the transaction. The list is ordered by preference and can be a list of one. The source determines which data representation from the list will be used for the transaction. In one embodiment, negotiation using the ordered lists is performed by the gateway devices; however, in alternate embodiments, other devices can perform the negotiation operations.

Network manager 140 communicates to the sink an ordered list of data representations that can be used for a transaction with the source. The list can contain one entry. The sinks can use the ordered list to adjust parameters to accommodate the most likely data representations that may be received.

Protocols such as SIP and H.323 do not define a method for a third party (i.e., one that is not directly involved in the communications transaction) to use statistical, or any other type of information, to reduce transcoding by manipulating the negotiation process between endpoints. By using network manager 140 the sources and sinks of IPS 100 can negotiate the data representation to be used for communications transactions.

Figure 2:
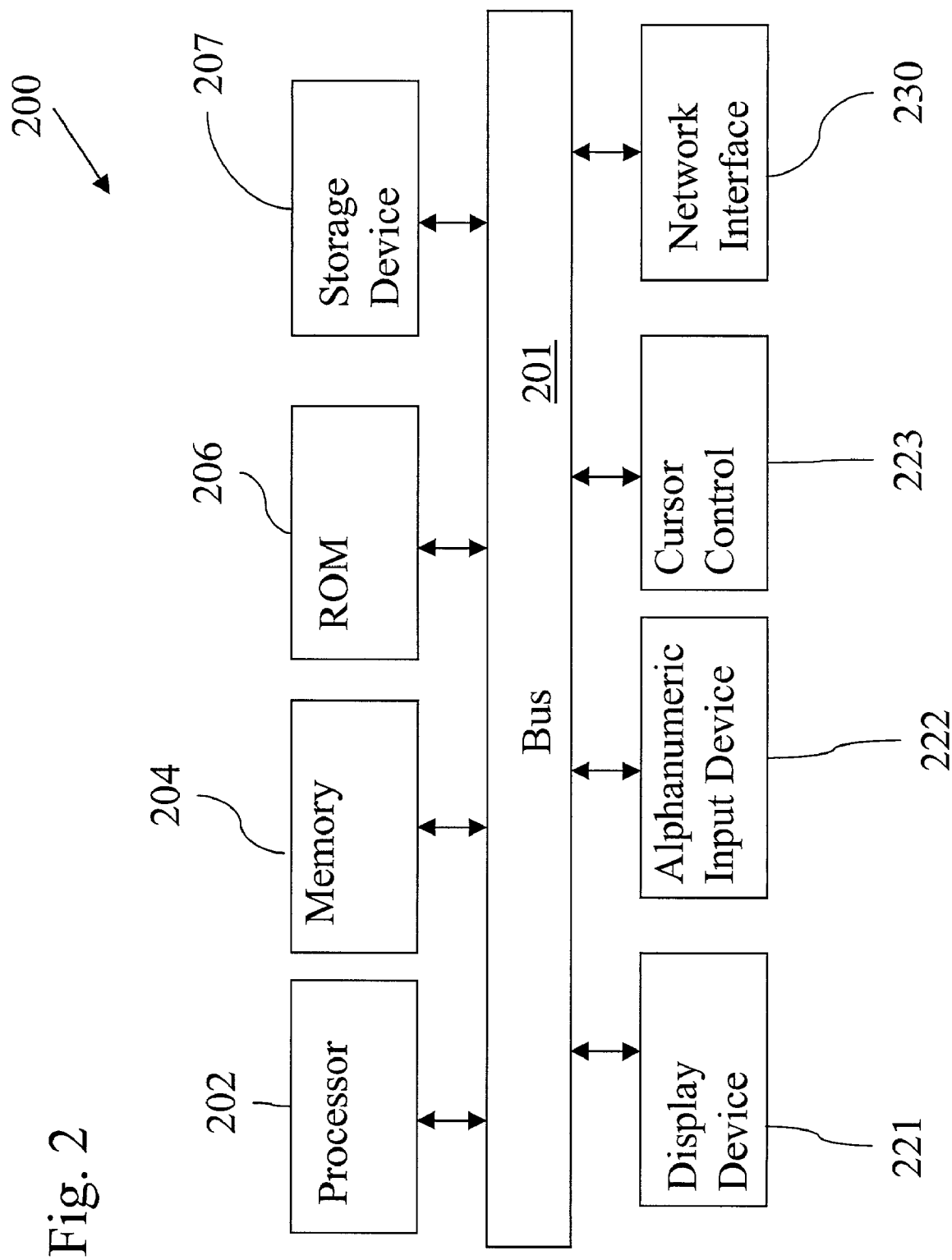
FIG. 2 is one embodiment of an electronic system.

In one embodiment, one or more of the network components of FIG. 1 (e.g., source, sink, gateway source, gateway sink, management device) is implemented as sequences of instructions executed by various electronic systems. The sequences of instructions can be stored by the electronic devices or the instructions can be received by the electronic devices (e.g., via a network connection). FIG. 2 is a block diagram of one embodiment of an electronic system. The electronic system illustrated in FIG. 2 is intended to represent a range of electronic systems, for example, computer systems, network access devices, etc. Alternative systems, whether electronic or non-electronic, can include more, fewer and/or different components.

Electronic system 200 includes bus 201 or other communication device to communicate information, and processor 202 coupled to bus 201 to process information. While electronic system 200 is illustrated with a single processor, electronic system 200 can include multiple processors and/or co-processors. Electronic system 200 further includes random access memory (RAM) or other dynamic storage device 204 (referred to as memory), coupled to bus 201 to store information and instructions to be executed by processor 202. Memory 204 also can be used to store temporary variables or other intermediate information during execution of instructions by processor 202.

Electronic system 200 also includes read only memory (ROM) and/or other static storage device 206 coupled to bus 201 to store static information and instructions for processor 202. Data storage device 207 is coupled to bus 201 to store information and instructions. Data storage device 207 such as a magnetic disk or optical disc and corresponding drive can be coupled to electronic system 200.

Electronic system 200 can also be coupled via bus 201 to display device 221, such as a cathode ray tube (CRT) or liquid crystal display (LCD), to display information to a computer user. Alphanumeric input device 222, including alphanumeric and other keys, is typically coupled to bus 201 to communicate information and command selections to processor 202. Another type of user input device is cursor control 223, such as a mouse, a trackball, or cursor direction keys to communicate direction information and command selections to processor 202 and to control cursor movement on display 221. Electronic system 200 further includes network interface 230 to provide access to a network, such as a local area network.

Instructions are provided to memory from a storage device, such as magnetic disk, a read-only memory (ROM) integrated circuit, CD-ROM, DVD, via a remote connection (e.g., over a network via network interface 230) that is either wired or wireless providing access to one or more electronically-accessible media, etc. In alternative embodiments, hard-wired circuitry can be used in place of or in combination with software instructions. Thus, execution of sequences of instructions is not limited to any specific combination of hardware circuitry and software instructions.

An electronically-accessible medium includes any mechanism that provides (i.e., stores and/or transmits) content (e.g., computer executable instructions) in a form readable by an electronic device (e.g., a computer, a personal digital assistant, a cellular telephone). For example, a machine-accessible medium includes read only memory (ROM); random access memory (RAM); magnetic disk storage media; optical storage media; flash memory devices; etc.

FIG. 3 is a flow diagram for negotiating a data representation to be used in a transaction where at least one of the participating devices in the transaction is part of a managed network.

Preference lists are acquired from each device of the managed network that is to be represented by the gateway sink or gateway source, 310. The preference lists can be acquired by the network manager or by the gateway source or sink. The preference lists can be requested by the network manager or gateway source or sink, or the reference lists can be provided by the devices of the managed network. In one embodiment, the preference lists include an ordered list of supported data representation formats. The list can include additional information, for example, conditional preference information, or any other information that would be useful in selecting a data representation to be used in a transaction.

A weighted list of data representations is generated from the individual preference lists, 320. In one embodiment, the weighted list is generated using a statistical analysis of the individual preference lists. The weighted list can also be generated by using conditional preference information or any other type of information that is included in the individual preference lists and/or any other information that is known about the transaction or the devices involved in a transaction.

A request for a communications transaction is received from a source, 330. The negotiating device then negotiates with the requesting device to select a data representation to be used in the communications transaction, 340. The negotiation process can be accomplished in any manner known in the art. For example, the communications transaction can use the data representation having the highest ranking on the weighted list that is supported by the requesting device. Other data representations from the list can be used also.

In one embodiment, the weighted list used for the negotiation process is generated based on the preference lists from only the devices involved in the transaction. In an alternate embodiment, the negotiation process can be based on a weighted list generated from preference lists corresponding to devices most likely to be involved in the transaction. Other weighted lists can be used as well. The communications transaction is started, 350.

The communications transaction continues until a change in system parameters is detected, 360. The change in system parameters can be any type of change, for example, a change in physical environment, a change in parameters provided by a system administrator, a change in user demographics. Other parameters can also be used. If a change in system parameters occurs, a new weighted list of data representations is generated, 320. Subsequent negotiations and corresponding communications transactions are based on the new parameters.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

In the foregoing specification, the invention has been described with reference to specific embodiments thereof. It will, however, be evident that various modifications and changes can be made thereto without departing from the broader spirit and scope of the invention. The specification and drawings are, accordingly, to be regarded in an illustrative rather than a restrictive sense.

What is claimed is:

1. A system comprising:
   a set of client electronic systems to communicate data with a remote server electronic device; and
   a gateway device coupled between the set of client electronic systems and the remote server electronic device, the gateway device to:
      negotiate at least one communications data representation to be used by the set of client electronic systems when communicating with the remote server electronic device, wherein if the set of client systems and the remote server electronic device do not use a common communications data representation, the gateway device negotiates the communications data representations to be used based, at least in part, on processing costs of the systems,
      select the communications data representation from one or more possible communications data representations based, at least in part, on aggregate weight values and/or preference values from the set of client electronic systems, wherein the aggregate weight values are determined based on preference lists from a plurality of client electronic systems to be involved in a transaction with the remote server electronic device.

2. The system of claim 1 wherein negotiation of a communications data representation comprises using a prioritized list of potential communications data representations and selecting a highest priority communications data representation supported by the remote server electronic device.

3. The system of claim 1 wherein negotiation of a communications data representation comprises using a prioritized list of potential communications data representations and selecting a highest priority communications data representation supported by two or more of the set of client electronic systems to be engaged in the transaction.

4. The system of claim 1 wherein one or more of the set of client electronic systems provides to the gateway a prioritized list of communications data representation to be used in transmitting data.

5. The system of claim 1 wherein one or more of the set of client electronic systems provides to the gateway a prioritized list of communications data representation to be used in receiving data.

6. The system of claim 1 wherein the aggregate weight and/or preference values comprises compiling prioritized lists from multiple client electronic systems.

7. A method comprising:
   receiving a request for a communications transaction with a gateway device coupled between a plurality of client electronic devices and a server electronic device;
   negotiating at least one a communications data representation for use in the transaction wherein if the plurality of client electronic devices and the server electronic device do not use a common communications data representation, the negotiation of the communications data representations for use is based, at least in part, on processing costs of the systems, wherein the communications data representation is selected from an aggregated prioritized list of supported data representations corresponding to multiple client electronic systems, the aggregated prioritized list being determined based on preference lists from the multiple client electronic systems, and further wherein the negotiation is performed by the gateway device; and
   initiating a communications transaction between multiple electronic systems coupled to the gateway device using a selected communications data representation.

8. The method of claim 7 wherein the aggregated prioritized list of supported data representations comprises an aggregate weighting of prioritized lists of supported communications data representations from multiple client electronic systems.

9. The method of claim 7 further comprising gathering a prioritized list of supported data representations from multiple client electronic systems coupled with the gateway device.

10. The method of claim 7 wherein the communications transaction is initiated between multiple client electronic systems of a managed network.

11. The method of claim 7 wherein the communications transaction is initiated between at least one electronic system of a managed network and at least one electronic system that is not part of the managed network.

12. An article comprising a tangible storage medium to provide instructions that, when executed, cause one or more electronic systems to:
   receive a request for a communications transaction with a gateway device coupled between a plurality of client electronic devices and a server electronic device;
   negotiate at least one communications data representation for use in the transaction, wherein if the plurality of client electronic devices and the server electronic device do not use a common communications data representation, the negotiation of the communications data representations for use is based, at least in part, on processing costs of the systems, wherein the communications data representation is selected from an aggregated prioritized list of supported data representations corresponding to multiple client electronic systems, the aggregated prioritized list being determined based on preference lists from the multiple client electronic systems, and further wherein the negotiation is performed by the gateway device; and
   initiating a communications transaction between multiple electronic systems coupled to the gateway device using a selected communications data representation.

13. The article of claim 12 wherein the aggregated prioritized list of supported data representations comprises an average weighting of prioritized lists of supported communications data representations from multiple client electronic systems.

14. The article of claim 12 further comprising instructions that, when executed cause the one or more electronic systems to gather a prioritized list of supported data representations from multiple client electronic systems coupled with the gateway device.

15. The article of claim 12 wherein the communications transaction is initiated between multiple client electronic systems of a managed network.

16. The article of claim 12 wherein the communications transaction is initiated between at least one electronic system of a managed network and at least one electronic system that is not part of the managed network.

* * * * *